US010769531B2

(12) United States Patent
Latapie et al.

(10) Patent No.: US 10,769,531 B2
(45) Date of Patent: Sep. 8, 2020

(54) METHODS AND SYSTEMS FOR COUNTING PEOPLE

(71) Applicant: CISCO TECHNOLOGY, INC., San Jose, CA (US)

(72) Inventors: Hugo M. Latapie, Long Beach, CA (US); Enzo Fenoglio, Issy-les-Moulineaux (FR); Santosh G. Pandey, Newark, CA (US); Andre Surcouf, Saint Leu la Foret (FR)

(73) Assignee: Cisco Technology, Inc., San Jose, CA (US)

( * ) Notice: Subject to any disclaimer, the term of this patent is extended or adjusted under 35 U.S.C. 154(b) by 704 days.

(21) Appl. No.: 15/163,833

(22) Filed: May 25, 2016

(65) Prior Publication Data

US 2016/0358074 A1 Dec. 8, 2016

Related U.S. Application Data

(60) Provisional application No. 62/171,700, filed on Jun. 5, 2015.

(51) Int. Cl.
*G06N 3/08* (2006.01)
*G06N 3/04* (2006.01)

(52) U.S. Cl.
CPC ........... *G06N 3/088* (2013.01); *G06N 3/0454* (2013.01)

(58) Field of Classification Search
CPC ........... G06K 9/00201; G06K 9/00778; G06N 3/0454; G06N 3/088; H04N 7/18
See application file for complete search history.

(56) References Cited

U.S. PATENT DOCUMENTS

| 6,269,351 | B1 * | 7/2001 | Black | G06F 16/30 |
| | | | | 706/15 |
| 8,892,488 | B2 | 11/2014 | Qi et al. | 706/45 |
| 2011/0099122 | A1 * | 4/2011 | Bright | G06Q 10/04 |
| | | | | 705/348 |
| 2011/0261211 | A1 * | 10/2011 | Lee | H04N 5/23203 |
| | | | | 348/211.4 |

(Continued)

FOREIGN PATENT DOCUMENTS

WO   WO 2014/105866   7/2014   ............... G06N 3/04

OTHER PUBLICATIONS

Bengio et al., "Greedy Layer-Wise Training of Deep Networks", Advances in Neural Information Processing Systems 19, 2006 (Year: 2006).*

(Continued)

*Primary Examiner* — Robert A Cassity
*Assistant Examiner* — Tsu-Chang Lee
(74) *Attorney, Agent, or Firm* — Campbell Stephenson LLP

(57) ABSTRACT

Various systems and methods for counting people. For example, one method involves receiving input data at an analytics system that includes a neural network. The input data includes a representation of an environment, including representations of several people. The method also includes identifying the representations of the people in the representation of the environment. The method also includes updating an output value that indicates the number of people identified as being present in the environment.

16 Claims, 18 Drawing Sheets

(56) References Cited

U.S. PATENT DOCUMENTS

| | | | |
|---|---|---|---|
| 2014/0139633 A1* | 5/2014 | Wang | G06K 9/00201 |
| | | | 348/46 |
| 2014/0177947 A1 | 6/2014 | Krizhevsky et al. | 382/156 |
| 2014/0316235 A1* | 10/2014 | Davis | A61B 5/7246 |
| | | | 600/407 |
| 2015/0100530 A1 | 4/2015 | Mnih et al. | G06N 3/08 |
| 2015/0178383 A1 | 6/2015 | Corrado et al. | G06F 17/30705 |
| 2015/0227782 A1 | 8/2015 | Salvador et al. | G06K 9/00288 |
| 2015/0269484 A1* | 9/2015 | Hawkins | G06N 7/005 |
| | | | 706/21 |
| 2015/0339571 A1 | 11/2015 | Krizhevsky et al. | G06N 3/04 |
| 2017/0330076 A1* | 11/2017 | Valpola | G06N 3/02 |
| 2020/0064444 A1* | 2/2020 | Regani | G01S 13/931 |

OTHER PUBLICATIONS

Sun et al., "Deep Learning Face Representation by Joint Identification-Verification", Advances in Neural Information Processing Systems 27, 2014 (Year: 2014).*

Ranzato, Marc' Aurelio, Boreau, Y-Lan, and LeCun, Yann, "Sparse Feature Learning for Deep Belief Networks," Courant Institute of Mathematical Sciences, New York University, INRIA Rocquencourt, pp. 1-8.

* cited by examiner

Environment
300

US 10,769,531 B2

METHODS AND SYSTEMS FOR COUNTING PEOPLE

CROSS-REFERENCE TO RELATED APPLICATIONS

This application claims the benefit under 35 U.S.C. § 119(e) of U.S. Provisional Patent Application No. 62/171,700, filed on Jun. 5, 2015, entitled "Methods and Systems For Counting People." The above-referenced application is hereby incorporated by reference herein in its entirety.

FIELD OF THE INVENTION

This application relates generally to data processing, and more specifically to systems and methods for using computers to determine a number of people in an environment.

BACKGROUND

Various classification problems exist. One such problem is people counting. Configuring a computing system to accurately identify a number of people in an environment based on a visual representation of the environment, such as an image, is a challenging task. The difficulty is exacerbated when the environment is crowded and occluded. Conventional methods of computer-based people counting are limited and tend to be slow, inaccurate, or both.

One conventional method of people counting relies upon measuring input and output flows to indirectly infer the number of people. For example, turnstiles can be used to measure the number of people that enter a space and the number of people that exit the space. By summing the measured number of people that enter the space and subtracting the measured number of people that exit the space, a calculated number of people is arrived at. However, the calculated number is really just an inference and depends upon several unverifiable assumptions, such as accurate measurement (e.g., no turnstile jumpers) and measurement at all egress and ingress points (no unmonitored ingress or egress points). The difference between the number of people measured and the actual number of people (the error) is typically undesirably high with conventional systems.

BRIEF DESCRIPTION OF THE DRAWINGS

The present disclosure may be better understood, and its numerous objects, features, and advantages made apparent to those skilled in the art by referencing the accompanying drawings.

DETAILED DESCRIPTION

Overview

Figure 1:
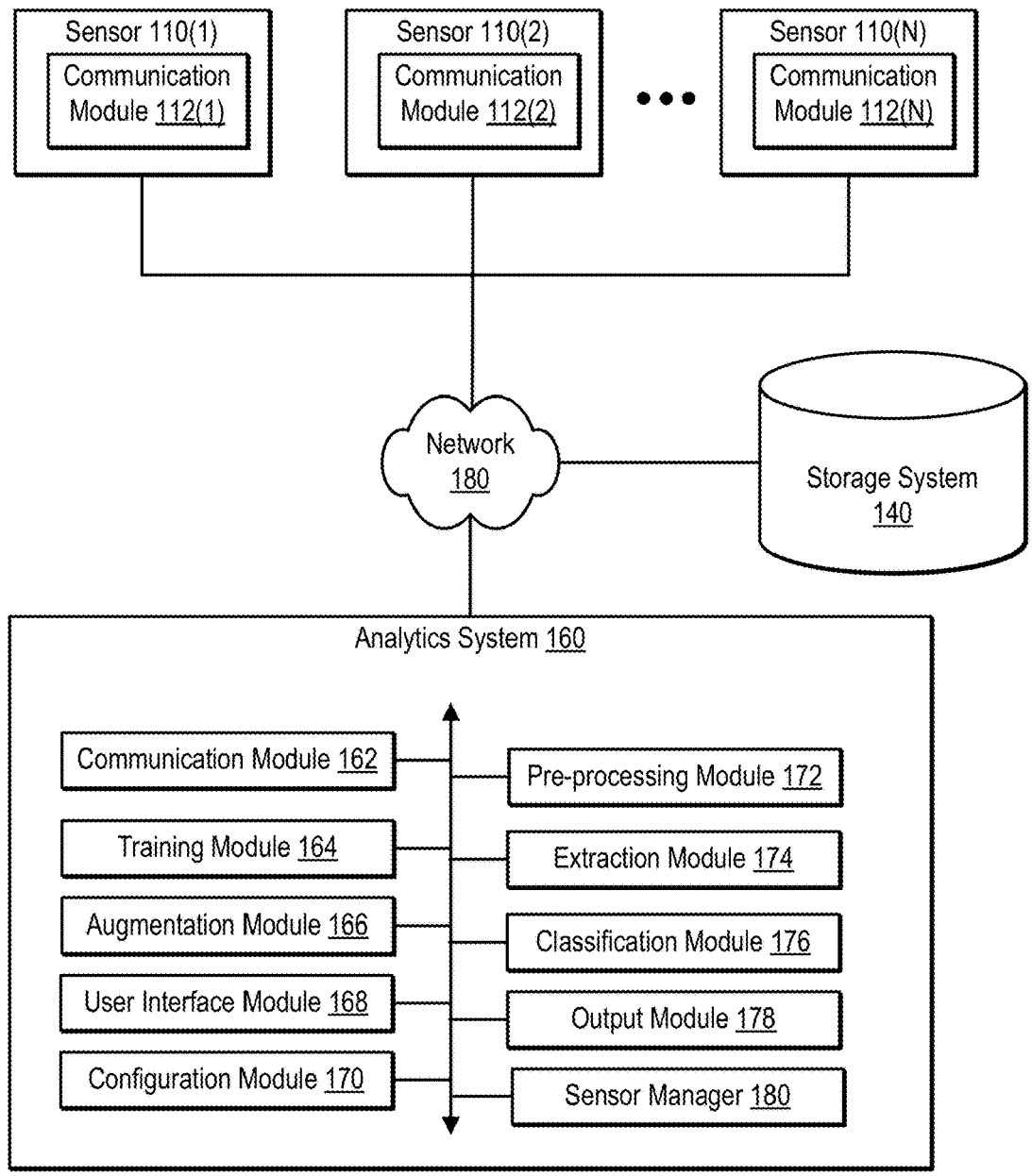
FIG. 1 is a block diagram illustrating an example system, according to one embodiment.

Various systems and methods for counting people. For example, one method involves receiving input data at an analytics system that includes a neural network. The input data includes a representation of an environment, including representations of several people. The method also includes identifying the representations of the people in the representation of the environment. The method also includes updating an output value that indicates the number of people identified as being present in the environment.

Interest is growing in technology related to connecting the physical world to the Internet, as exemplified by the Internet of Things. Visual information is a rich source of information regarding the physical world, and can be used in a number of contexts, such as people, object, and behavior counting and tracking. Manipulating visual information places high demand on computing resources, such as transmission bandwidth and computing cycles. Increasing the capabilities of technology to perform such tasks with the desired speed and accuracy presents significant technological challenges.

People counting is an area that is benefiting from research and development efforts. Several approaches have been explored. For example, counting mobile devices is one way to estimate the number of people in an environment. Another approach is to position one or more cameras in proximity to each entry and exit point for a given region. Both of these techniques can be used to infer occupancies in regions of interest (ROI). However, these techniques tend to be highly inaccurate and subject to cumulative errors that minimize the effectiveness of these approaches. Furthermore, it is desirable to reduce the number of cameras used to count people. Using multiple cameras increases the complexity and cost of the system. Numerous challenges exist in accurately counting people in a region. Such challenges include, for example: large irrelevant variations, such as background, pose, occlusion, and surrounding objects; luminosity change during the day and the seasons; and projective distortion.

A system, such as that described herein, can provide visual sensing technology using diverse sensor inputs including, for example, cameras, wireless access points, beacons, and the like. The system can process the input data captured by sensors using various methodologies in, for example, computer vision (CV), machine learning (ML), and deep-learning (DL). These methodologies can be used to accurately count, locate, track, and identify persons, objects, and activities. Such approaches can be employed in various applications, such as, among others, retail (e.g., shopping cart), entertainment (e.g., player trajectory in field), and industrial (e.g., tracking fork lifts in warehouses), to name a few examples.

Using a system that leverages DL typically involves pre-training the system before the system is deployed operationally. Pre-training according to the methods and systems described herein involves, in one embodiment, an iterative cycle of providing input values to the system, where the input values correspond to known expected outputs. From the pre-training, the system "learns" the inputs and corresponding likely outputs. The pre-training facilitates the accurate decoding of actual data when the system is employed in an operational environment. One drawback encountered in pre-training is that the process can take a significant amount of time, on the order of hours or days. Reducing the time spent on pre-training can lead to learned systems that exhibit high error rates, e.g., in the case of a production application aimed at people detection and counting.

Pre-training of DL systems is sometimes done in an unsupervised generative fashion. Discriminative pre-training can sometimes be used as an alternative to generative pre-training and can reduce the number of iterations of fine-tuning compared to generative pre-training. However, discriminative pre-training sometimes lacks generality as compared to generative pre-training, and thus performs slightly worse than generative methods. Combining generative pre-training techniques and discriminative pre-training techniques can achieve improved results.

Hybrid-Deep Learning (HDL), as described herein, systematically combines different deep methods (e.g., generative and discriminative) with classic machine learning methodologies to reduce training time and improve performance. For example, HDL systems can be effectively pre-trained on commercial computer systems using a reduced set of carefully selected positive samples. Alternatively, HDL systems can be effectively pre-trained using relatively large batch size during a fine-tuning on more powerful computing systems, such as graphics processing unit (GPU) cluster servers. HDL systems, as compared to systems that use only ML or DL alone, can achieve significant reductions in the amount of time used in pre-training systems that can be used to accurately perform various people counting activities, such as counting people in crowds of various density, detecting suspicious activities, identifying faces, and the like.

Conventional ML techniques involve careful engineering design and considerable domain expertise to hand craft feature extractors that transform input raw data (e.g., 2D pixel arrays) into a suitable internal representation (e.g., a feature vector) from which the learning system detects and classifies patterns. Hand crafted classification algorithms may be suitable for a particular task or environment. However, hand crafting algorithms tends to be a slow process, and the algorithms tend to be brittle. That is, while a hand crafted algorithm may accurately perform a task, such as crowd counting, for a specific data set, such algorithms tend to be inaccurate when attempts are made to generalize them to other data sets.

On the other side, for pure DL techniques the representation learning includes a set of methods that allows a machine to be fed raw data and automatically discover the proper internal representations needed for detection or classification. In one embodiment, the internal representation or semantic fingerprint of the input raw data is built using a specific model.

In one embodiment, a two-phase feature extraction method is used that leverages domain-specific algorithms and feeds into a DL generative model. In some instances, DL has been defined as being an optimal feature extractor. A combined approach is described herein that reduces training resources used, such as computing cycles, time, and quantity of data, and increases the ability of the trained model to generalize. One embodiment also adds further domain specific transformation invariances via addition of dynamic data transformation pre-processors for data augmentation. The present disclosure also describes using sparse distributed representations as the output of the generative model to enhance the stability and accuracy of the discriminative classifier output phase. Semantic fingerprints are also leveraged to incorporate domain expertise into DL based systems.

Example System

FIG. 1 is a block diagram illustrating system 100, which can be deployed to count people in crowded and occluded environments, such as airports, bus stations, shopping malls, sporting venues, and the like. In addition to people counting, system 100 is suitable for use in people tracking, object detection, and other classification problems. System 100 includes a plurality of sensors 110(1)-110(N), referred to herein collectively as sensors 110. System 100 also includes a storage system 140, and an analytics system 160. In one embodiment, some or all of the components shown in FIG. 1 are coupled via a network 150. Network 150 can include a WAN (Wide Area Network), such as the Internet, one or more LANs (Local Area Networks), and/or one or more SANs (Storage Area Networks). Some or all of the components can be deployed in or near an environment to determine the number of people in the environment or a specified portion of the environment.

Sensors 110 can be implemented as, for example, video or still image cameras, global positioning system (GPS) receivers, Bluetooth transceivers, wireless access points (WAPs), cellular communications devices, or any other device that can be configured to detect and/or indicate the position of a person or object. Sensors 110 are configured to communicate, via respective communication modules, referred to collectively as communication module 112, information to one or more remote locations. For example, when a sensor 110 is implemented as a camera, sensor 110 can capture visual data, such as a video stream and/or still image. Sensor 110 can transmit the visual data, e.g. via network 150 to storage system 140 or to analytics system 160. In one embodiment, communication module 112 formats the data for transmission. Formatting the data can involve, for example, compression and/or encryption operations.

Analytics system 160 includes a communication module 162. Communications module 162 is configured to receive data generated by one or more of sensors 110 as well as status and control messages from sensors 110. Communication module 162 can also transmit commands to sensors 110. Such commands can include commands to power on or off, as well as to change one or more operating characteristics of the sensors, such as light filters, viewing angles, capture mode, position adjustments, test messages, and the like. For example, in response to detecting an anomalous or unexpected count (e.g., a count that exceeds pre-specified thresholds regarding change or absolute measurements), analytics system 160 can instruct communications module 162 to transmit a command adjusting the position of one or more of sensors 110, adjusting the frequency with which sensor 110 samples the environment (e.g., receives and transmits position data), testing functionality of the sensor, or the like. Communications module 162 is also configured to transmit received input data to pre-processing module 172.

Analytics system 160 includes a training module 164. A user of system 100 can implement training operations for a machine learning system, such as a deep neural network, using training module 164. Though described in terms of neural networks, the system described herein can be implemented using a system implementing a multi-level non-linear function of some type. In one embodiment, training a machine learning system involves, providing annotated input data to the machine learning system and observing and evaluating the machine learning system's output. Training module 164 receives input data, such as ground truth data, or data for which the variable the system is determining has already been manually determined, or is otherwise known. Ground truth data is used to measure the accuracy of the machine learning system by comparing the output of the machine learning system with a known measurement. The accuracy of a deep learning system depends, at least in part, on the sequence in which training data is provided to the deep learning system, pre-processing of the training data, and selection of training data used. Domain expertise can be used to select elements of training data, the order in which the training data is presented to the deep learning system, and certain sorts of invariances. Training module 164 is configured to transmit training data to, for example, classification module 176. After being effectively pre-trained, a system can be adapted for use in different environments with no additional learning, or a reduced number of training cycles.

Analytics system 160 also includes an augmentation module 166. Augmentation module 166 can be used to augment input data. In one embodiment, a user performs data augmentation dynamically. Performing data augmentation includes, for example, using domain-specific knowledge to improve performance of the machine learning system. Domain specific expertise, as used herein, provides a context in which a deep learning system can operate. Domain specific expertise can include, for example, information about way people move in a particular setting. This information can be specific to a particular environment. For example, if the environment includes a sports stadium, certain types of motion are expected. The type of motion can vary based on numerous factors, such as the sport involved, the size and structure of the environment, and the like. Experts familiar with such environments can provide their expertise and select input data and augmentations to that input data that are more likely to quickly train a deep learning system to provide accurate output. Augmentation module 166 is, in one embodiment coupled to training module 164 such that data augmented using augmentation module 166 is presented to training module 164.

Analytics system 160 also includes a user interface module 168. A user can employ user interface module 168 to configure various aspects of system 100. For example, user interface module 168 can configure and control sensors 110 as well as monitor the performance and output of sensors 110. User interface module 168 can also be used to initiate operations based on the output of a machine learning system, as included in analytics server 160.

Analytics system 160 also includes a configuration module 170. Configuration module 170 can be used to configure system 100. For example, configuration module 170 can receive input specifying a type, number, or configuration of components in a machine learning system. For example, an operator can specify that restricted Boltzmann machines are to be used as the components of the machine learning system. In one embodiment, configuration module 170 evaluates one or more pre-specified criteria and automatically configures the machine learning system architecture. For a specific problem, a specific topology often enhances output accuracy. For example, the number of layers in a deep learning system, and the configuration of those layers, depends upon the application. When the application is, for example, people counting, certain configurations of a deep learning system are most effective.

Configuration module 170 can also receive input from a user indicating various operational parameters, such as what type(s) of data should be captured (e.g., which type of sensors to use), from where (e.g., which sensors should be used, or which portions of the environment should be monitored), what information should be generated (e.g., people count, people tracking, abandoned object detection, suspicious motion alert), and the like. The user can also specify various training parameters, such as type of input data, desired accuracy, type of machine learning components, and the like.

Analytics system 160 also includes a pre-processing module 172. Pre-processing module 172 can be used to modify or enhance input data prior to the data being processed by a machine learning system. Pre-processing elements can be selected based upon evaluation of one or more conditions. For example, if analytics system 160 achieves limited accuracy in a particular environment, a particular quantization component can be selected for that environment, whereas analytics system can include a different quantization component for a second environment for which analytics system 160 achieves high degrees of accuracy. In another example, performance characteristics, such as available computing resources, can be used as the basis for selecting elements of pre-processing module 172.

Analytics system 160 also includes an extraction module 174. In one embodiment, extraction module 174 is implemented as a generative component of a deep learning system. Extraction module 174 is configured to perform feature extractions using input data. In one embodiment, this involves generating a feature vector stream. The feature vector stream can be represented using a sparse distributed representation.

Analytics system 160 also includes a classification module 176. In one embodiment, classification module 176 is implemented as a discriminative component of a deep learning system. Classification module 176 is configured to generate an output that represents, for example, the number of people present in a particular region of interest (ROI). In one embodiment, the output represents the semantic fingerprint of the input.

Analytics system 160 also includes an output module 178. Output module 178 configures the output and distributes the output in such a way that the output can be used by a user of system 100. For example, the output can be presented to the user via user interface module 168. The output module 178 can transmit the output data for storage in storage system 140. Storage device 140 provides persistent data storage, such that data stored on storage device 140 will remain stored even after the storage device is powered off. Storage device 140 can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Storage device 140 can also be a virtual or logical storage device that is implemented on such physical storage devices and/or storage systems. For example, storage device 140 can be a logical volume that is implemented on a RAID storage system. Additionally, storage device 140 can include one or more storage devices. Storage device 140 can also include one or more types of storage media, including solid state media (e.g., flash drives), optical media (e.g., CDs and DVDs), and magnetic media (e.g., hard disks or magnetic tape). In some embodiments, storage device 140 can be implemented using cloud storage, in which the storage device is a logical storage device to which physical storage device(s) are allocated on an as-needed and/or as-contracted basis.

Analytics system 160 also includes a sensor manager 180. Sensor manager 180 receives input data from sensors 110. In one embodiment, sensor manager 180 combines input from multiple sensors. Data from one or more sensors 110 can be captured real time and saved to storage system 140.

Example Modules

Figure 2A:
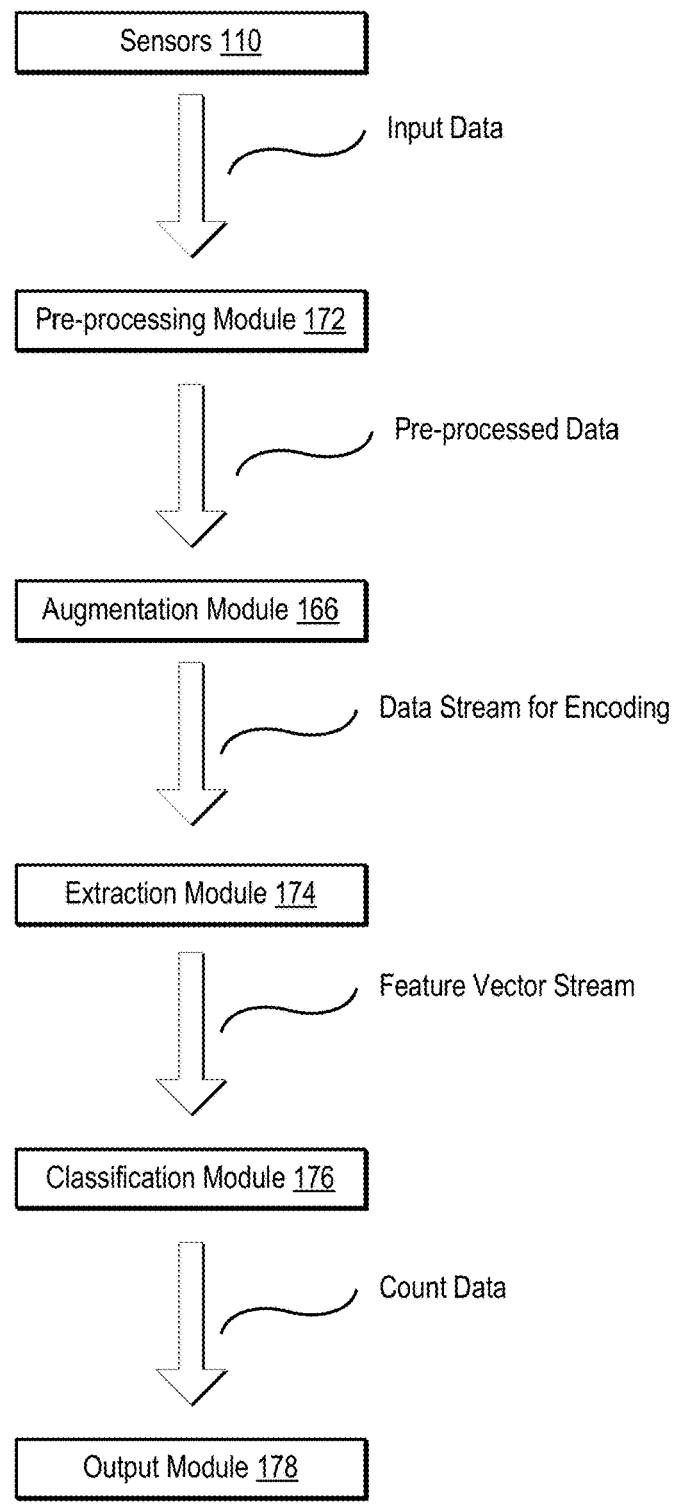
FIGS. 2A-2F are block diagrams illustrating example modules, according to embodiments.

FIG. 2A is block diagram showing operational aspects of modules introduced with regard to FIG. 1. As shown in FIG.

2A, pre-processing module 172 receives input data, e.g., from sensors 110, and pre-processes the data. During training, pre-processing module 172 transmits the pre-processed data to augmentation module 166. Augmentation module 166 is configured to enhance the pre-processed data further using, e.g., variances introduced by a domain expert. During operational execution pre-processing module 172 transmits the data to extraction module 174. Extraction module 174 generates a feature vector using a generative deep learning process implemented by, for example, a deep belief network. Extraction module 174 transmits the feature vector stream to classification module 176. Classification module 176 generates a stream of count data, such as a number of people or objects represented in a stream of video data, behavioral data associated with the stream of video data, and the like. Output module 178 receives the count data and executes one or more output functions, as described below.

Figure 2B:
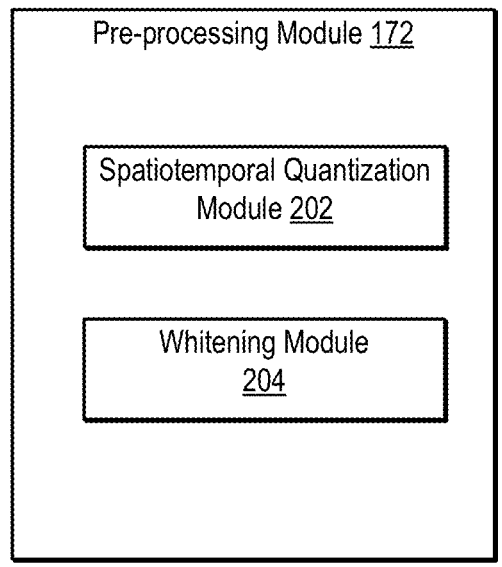

FIG. 2B is a block diagram showing additional details of pre-processing module 172. Pre-processing module 172 includes, in one embodiment, spatiotemporal quantization module 202. Quantization involves, in one embodiment, mapping large numbers of input values, such as color data from an image or position data from a moving transmitter, to a smaller set of discrete values. Spatiotemporal quantization helps a deep learning system converge more quickly. This is due in part to reducing the amount of data to be processed by the deep learning system. Spatiotemporal quantizer 202 is configured to add a time element to "3D" image and location data. For example, as a person moves into a location, video data captures the transition over time of empty space to occupied space. Depending on the time interval chosen, such a transition can be processed as a gradual transition, or an abrupt shift, e.g., in the color of pixels representing the location. Pre-processing module 172 also includes, in one embodiment, whitening module 204. Whitening module 204 is configured to provide decorrelation of input data. In certain applications, if one value is seen as having a certain distribution in a set of data (e.g., position input data), the distribution can affect the probability that the value will be seen in other locations. The value predicted for the other locations is thus seen as correlated to the locations represented by the distribution. This correlation can lead to false optima when employing a deep learning system. Whitening the input data helps prevent such issues by transforming the data to uncorrelated values.

Figure 2C:
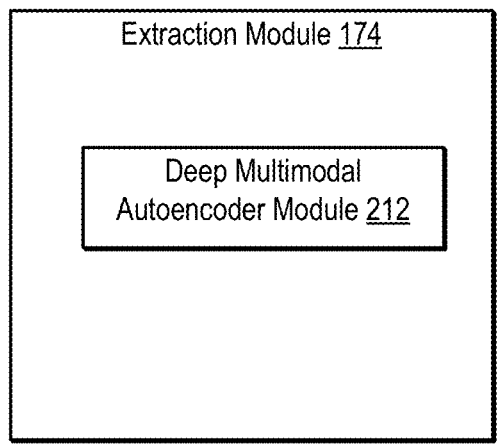

FIG. 2C is a block diagram showing additional details of an extraction module 174. Extraction module 174 can implement a generative model. In generative approaches for prediction tasks, a joint distribution is modelled on inputs and outputs. Parameters are typically estimated using a likelihood-based criterion. In one embodiment, extraction module 174 includes a deep multimodal autoencoder module 212. The deep multimodal autoencoder includes, in one embodiment, an artificial neural network used for learning representations, or encodings. In one embodiment, a generative autoencoder is built using Gaussian-Bernoulli restricted Boltzmann machines. The autoencoder is trained in unsupervised mode until an acceptable level of reconstruction error is reached, indicating that the model is deep enough to properly represent data.

Figure 2D:
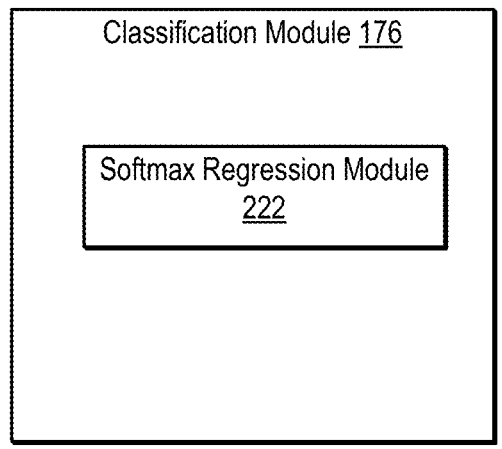

FIG. 2D shows additional details of classification module 176. Classification module 176 can implement a discriminative model. In discriminative approaches, the mapping from inputs to outputs is modelled either as a conditional distribution or simply as a prediction function. Parameters can be estimated by optimizing objectives related to various loss functions. In one embodiment, classification module 176 includes a softmax regression module 222.

Figure 2E:
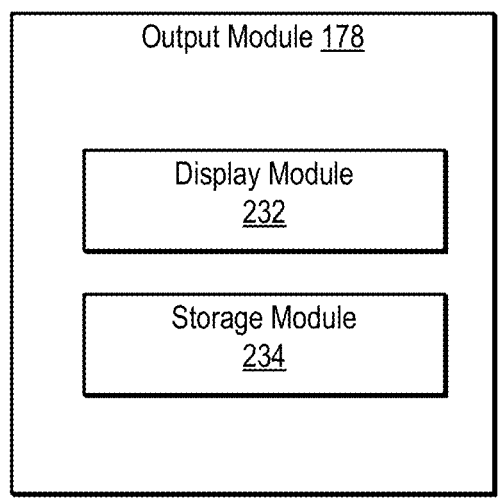

FIG. 2E is a block diagram showing additional details of output module 178. In one embodiment, output module 178 includes display module 232. Display module 232 controls, in one embodiment, a screen on which various output results, such as people counts and alerts are displayed. Display module 232 can also be used to receive input regarding operations that are to be performed in response to the output results. For example, if a display shows an indicator that the number of people in a ROI exceeds a pre-specified threshold capacity, the display can show a control that can be activated to perform a physical task in the environment, such as closing or opening an entrance or exit. Output module 178 also includes, in one embodiment, storage module 234. Storage module 234 can indicate available storage resources, and can be configured to receive input specifying various storage parameters, such as format, frequency, retention, and the like.

Figure 2F:
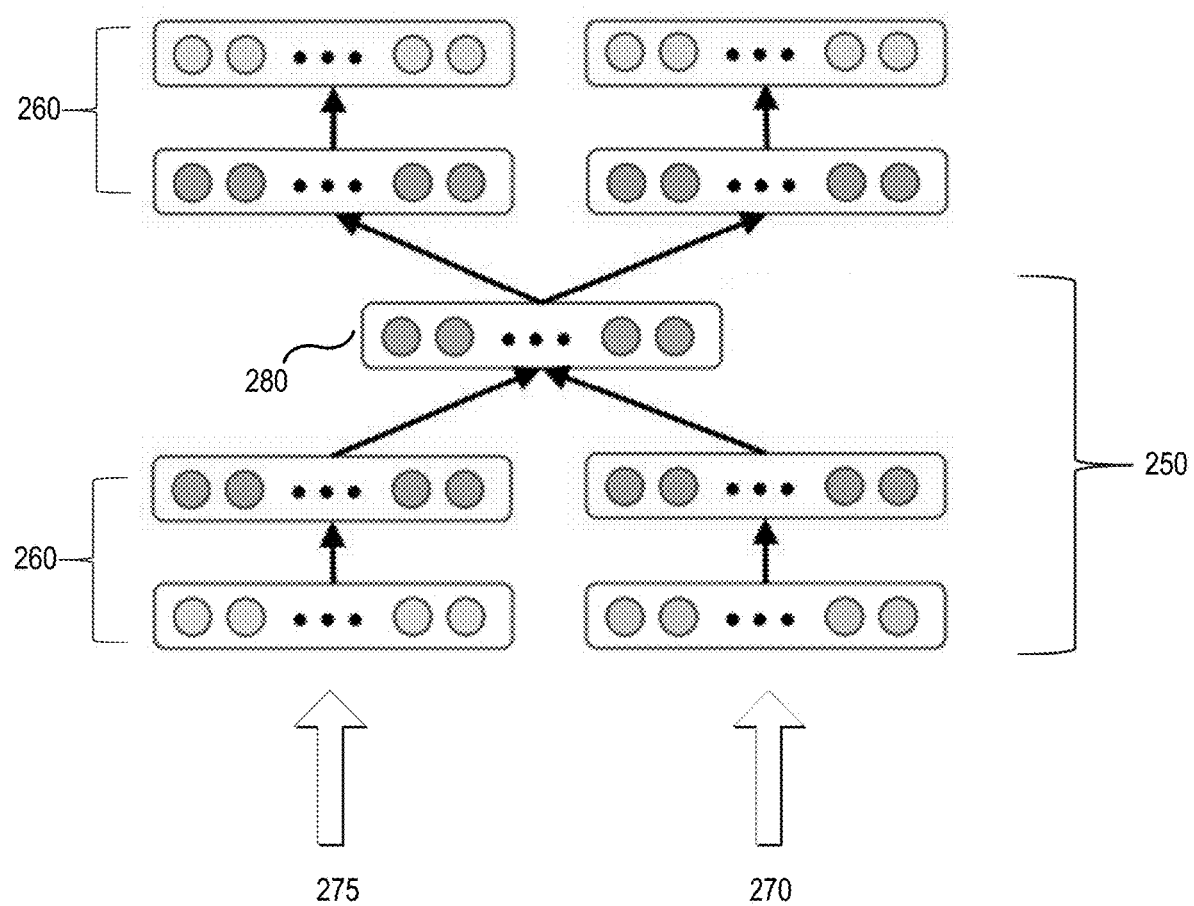

FIG. 2F is a block diagram showing an example DL system. The system includes a deep belief network (DBN) 250. DBN 250 includes a stack of RBMs 260. The number of layers of RBMs, or the depth of the stack, is variable depending on the domain. The DBN shown in FIG. 2F is configured to process input data from multiple sources, such as Wi-Fi input data 275 and video input data 270. The DBN generates a shared representation 280 from the various sources of input data. Using additional layers of RBMs 260, the input data is reconstructed as feature vectors corresponding to the various input data sources.

Example Environment

Figure 3:
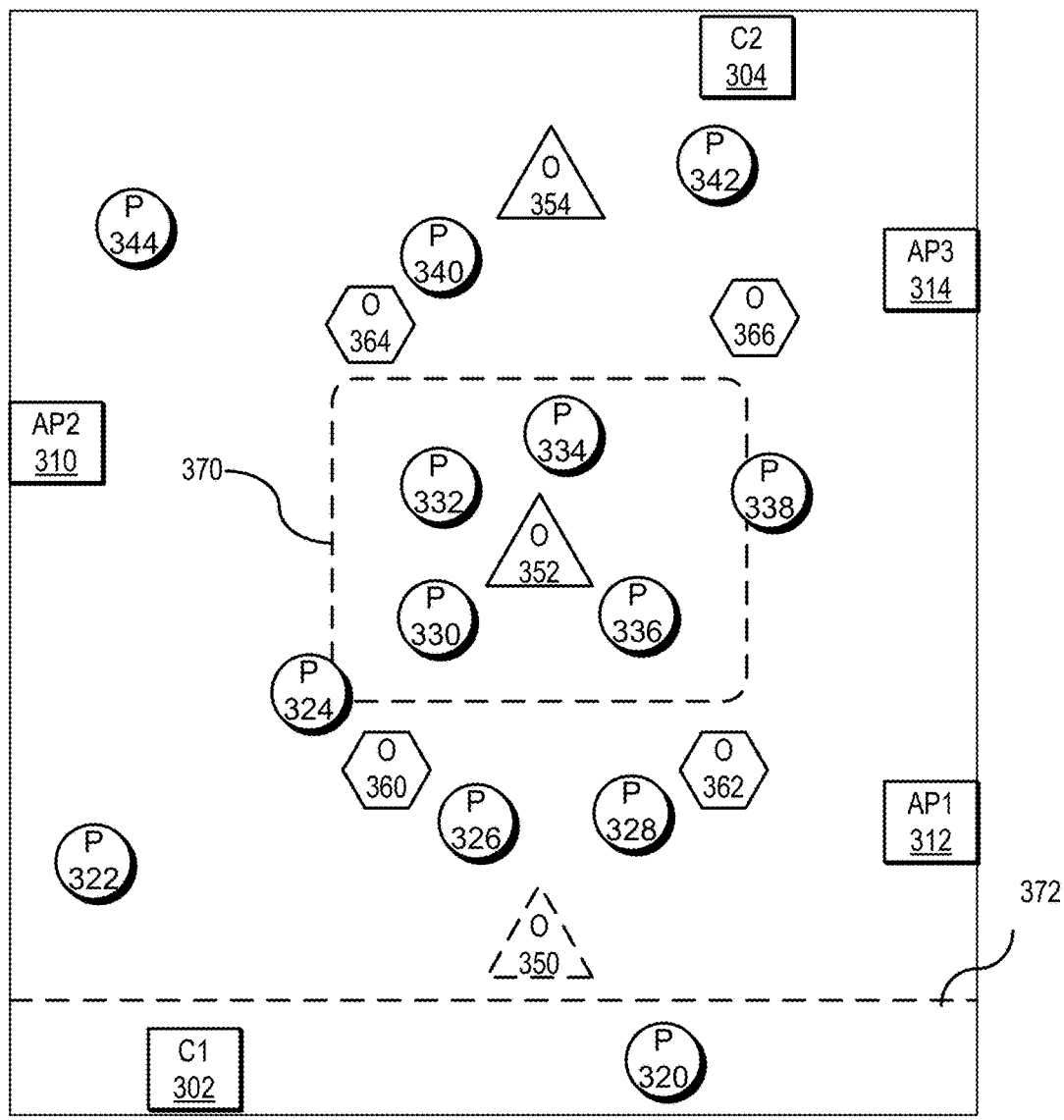
FIG. 3 is a block diagram illustrating an example environment, according to one embodiment.

FIG. 3 is a block diagram showing an example environment 300. A crowd counting system, such as the system 100 of FIG. 1, can be deployed to determine the number of people in all of environment 300 or in specified portions of environment 300. As shown, environment 300 includes people 320-344. Environment 300 also includes a number of obstructions 350-366. Environment 300 also includes a number of sensors 302-314. As shown, sensors 302 and 304 are implemented using cameras, and sensors 310, 312, and 314 are implemented using wireless access points. Wireless sensors can include Bluetooth transceivers, access points, cellular transmitters, angle of arrival antennae, and the like. Input data from multiple sources, such as Wi-Fi, beacons, and video, can be combined in a process known as data fusion. Wi-Fi data provides unique identity information, such as a MAC address, and video data provides location information.

Environment 300 can be divided into one or more regions of interest. For example, 370 defines a region of interest and 372 defines a second region of interest. These regions of interest can be defined by virtual tripwires, geofencing, or numerical coordinates. The regions of interest can be dynamically selected by a user or a configuration module, such as configuration module 170 of FIG. 1, or can be predefined for the environment.

As shown, FIG. 3 is a representation from above environment 300. In practice, creating such a view could be performed using a satellite imaging system, or the like. Many environments will utilize position detecting equipment, such as cameras, that is configured to view the environment at a more surface-level view. That is, instead of viewing environment 300 from the top, the sensors view environment 300 from the edge. In such a configuration, obstructions block the view, increasing the difficulty of identifying and counting people present in environment 300. Sensors can be positioned to account for fixed obstructions, and sensors can be movable to compensate for obstructions as well.

Example Methods

Figure 4:
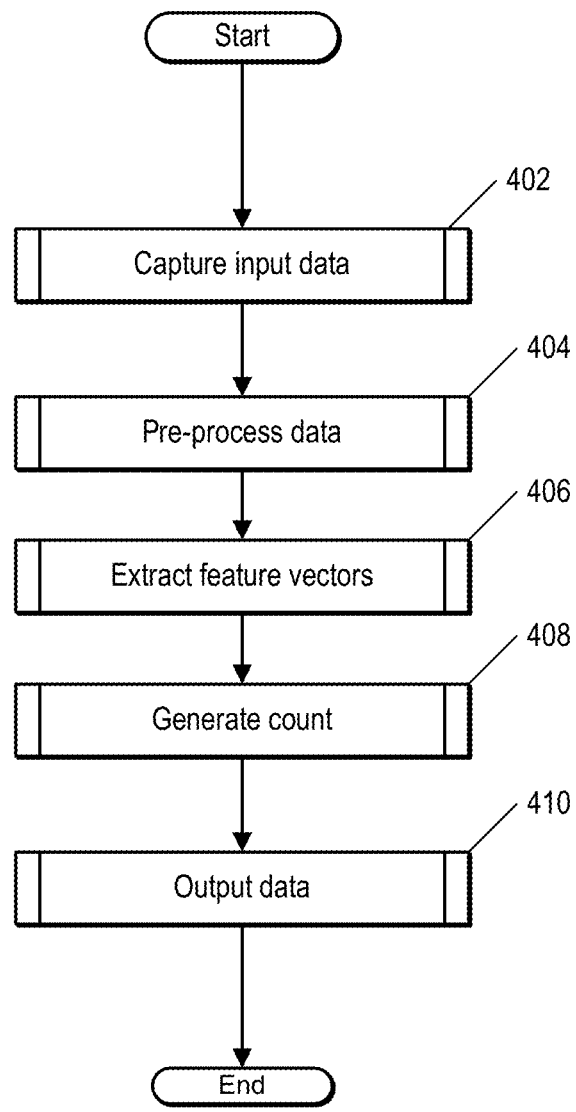
FIGS. 4-14 are flow charts illustrating example processes, according to embodiments.

FIG. 4 is a flow chart illustrating a process for counting people using a deep learning (DL) system, such as system 100 of FIG. 1. FIG. 4 shows an example arrangement of operations. For FIGS. 4 through 14, additional operations can be included, operations can be omitted, and operations can be reordered. Though arranged serially, the operations in these figures can be performed in parallel. The operations can be implemented using specific hardware, software, firmware, or combination thereof.

At 402, the DL system captures input data. In one embodiment, this involves one or more sensors, such as sensors 110 of FIG. 1, capturing a representation of an environment, such as environment 300 of FIG. 3. Additional details regarding capturing input data are described with regard to FIG. 5.

The DL system pre-processes, at 404, the input data. Pre-processing the input data improves the accuracy of the DL system. Additional details of pre-processing data are described with regard to FIG. 8.

At 406, the DL system employs a generative process to encode the pre-processed input data as a feature vector. Additional details regarding feature vector extraction are described with regard to FIG. 9.

The DL system generates, at 408, an output value, such as a count value, associated with input data. In one embodiment, this involves employing a discriminative classification process. Additional details regarding generating a count are described with regard to FIG. 10.

At 410, the DL system outputs data. In one embodiment, this involves performing one or more output routines based on the generated output value. Additional details regarding outputting data are described with regard to FIG. 11.

Figure 5:
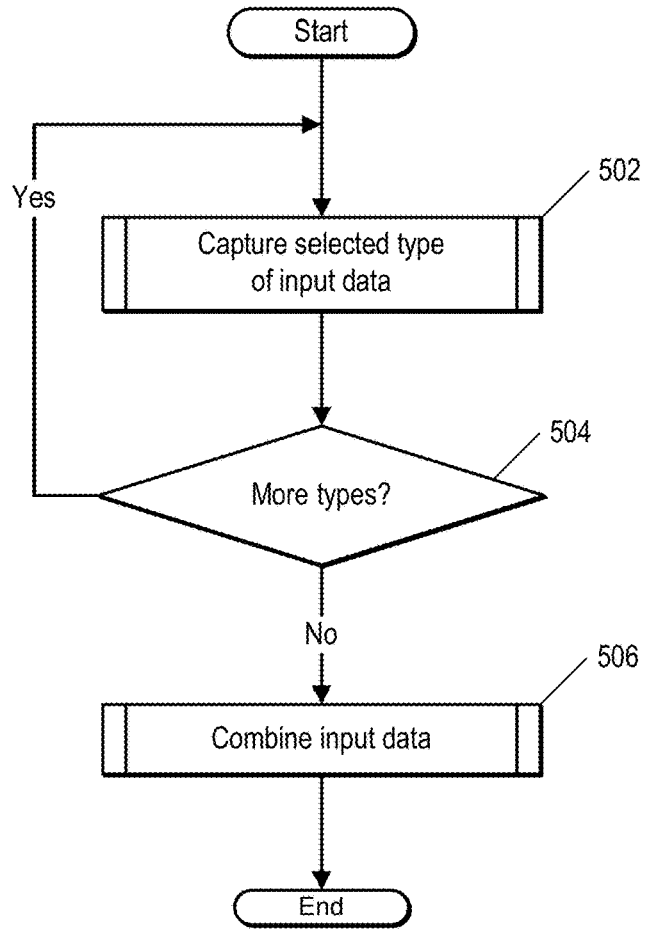

FIG. 5 is a flow chart showing additional details of a process of capturing input data. In one embodiment, the process described in FIG. 5 can be performed by a DL system, such as system 100 of FIG. 1. At 502, the DL system captures input data of a selected type using a sensor, such as sensor 110 of FIG. 1. For example, a user can configure a sensor, such as a camera, to capture video.

At 504, the DL system determines whether additional types of input data exist. For example, multiple sensors can be included in the system. If additional types of sensors are configured to capture input data, the process returns to 502, and the sensors capture additional input data. At 506, input data for multiple sensors is combined. If a single sensor is employed, 506 is omitted.

Figure 6:
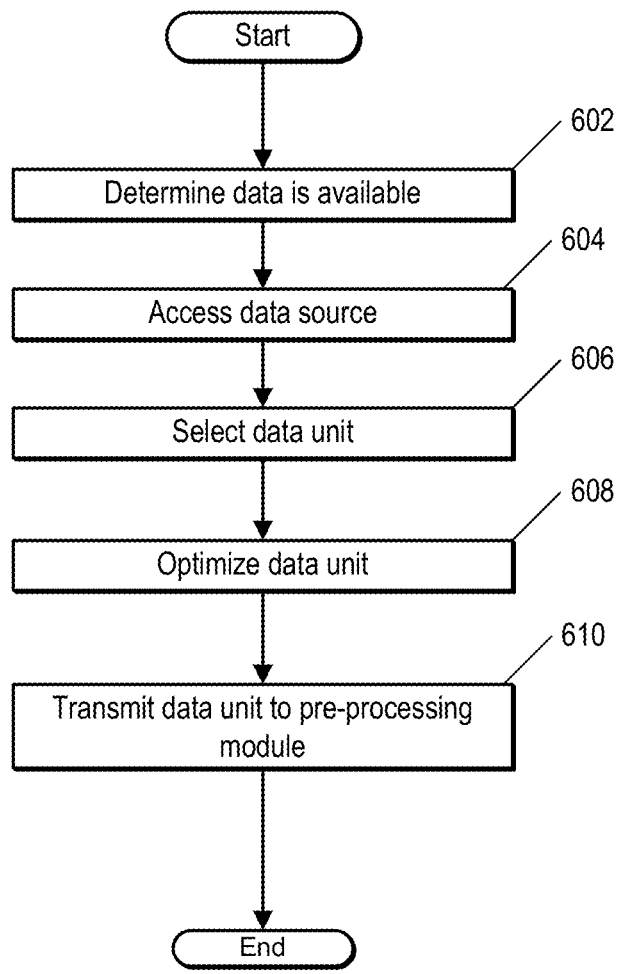

FIG. 6 is a process of inputting data by a DL system, such as system 100 of FIG. 1. The DL system determines, at 602, that data is available to be input. In one embodiment, determining that a particular sensor is active serves to notify the DL system that data will be available from that sensor.

At 604, the DL system accesses the data source, e.g., sensor. The DL system selects, at 606, a data unit. For example, when the data source is a camera and the input data is a video stream, the DL system can select a frame or multiple frames of the video data. Selection of a unit of data can be based on, for example, time stamp information, size of a data unit, and the like.

At 608, the DL system optimizes the selected data unit. For example, the DL system can compress the data unit. In one embodiment, the DL system compares the data of the data unit with data from a previous data unit, and discards data which has not changed. Optimizing the data reduces the amount of extraneous (e.g., unchanged or uncompressed) data that the DL system processes. At 610, the DL system transmits the data unit to a pre-processing module, such as pre-processing module 172 of FIG. 1.

Figure 7:
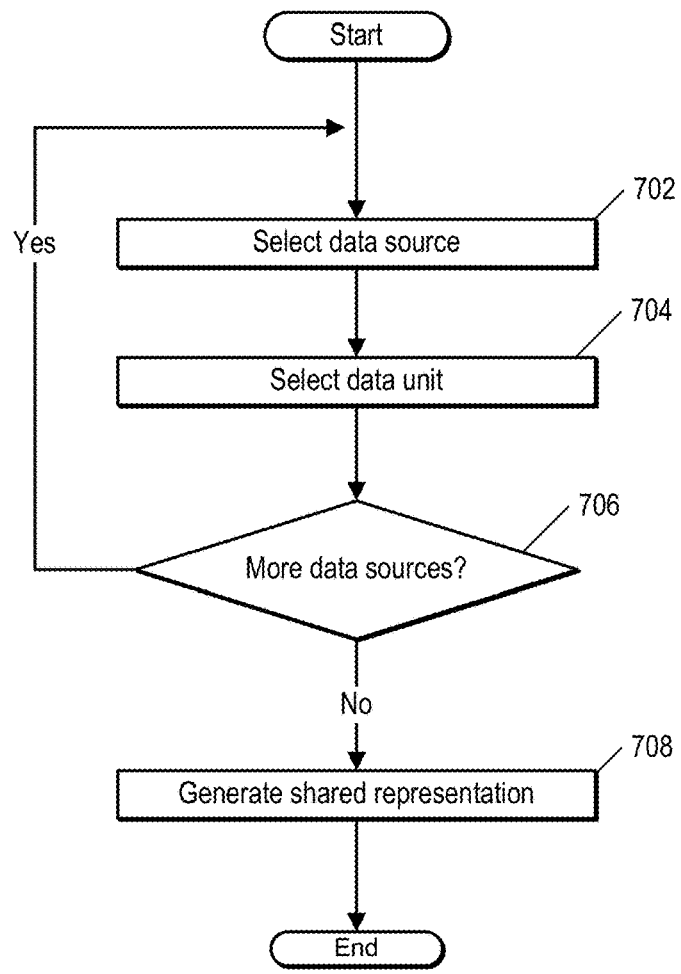

FIG. 7 is a flow chart showing a process of combining input data. In one embodiment, the process shown in FIG. 7 can be performed by a DL system, such as system 100 of FIG. 1. At 702, the DL system selects a data source. Data sources can include, for example, various sensors, such as sensors 110 of FIG. 1. These can include cameras, wireless access points, and the like. The data can include video data, still image data, GPS coordinates or other position data, and the like.

The DL system selects, at 704, a data unit. In one embodiment, the data unit comprises a frame of video data from a camera. At 706, the DL system determines whether data is available for additional data sources. For example, data can be available at a given point in time from both cameras and wireless access points. At 708, the DL system generates a shared representation. Generating a shared representation involves, in one embodiment, combining video data with wireless data.

Figure 8:
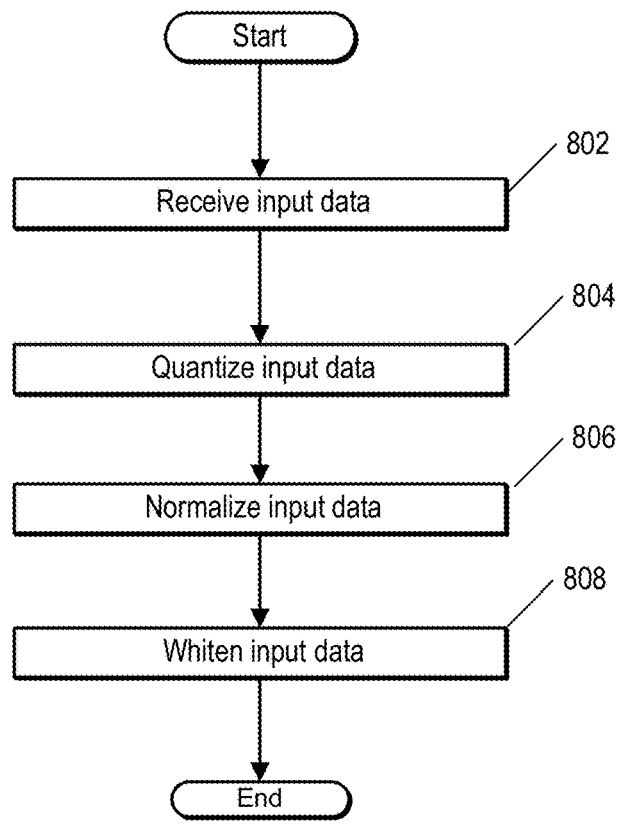

FIG. 8 is a flow chart showing a process of pre-processing data, according to one embodiment. The process shown in FIG. 8 is performed, in one embodiment, by a DL system, such system 100 of FIG. 1. Specifically, the process shown in FIG. 8 is performed by a pre-processing module, such as pre-processing module 172 of FIG. 1.

At 802, the pre-processing module receives input data. In one embodiment, the input data includes a frame of video data that was captured by a sensor, such as sensor 110 of FIG. 1. The pre-processing module quantizes, at 804, the input data, as described above. At 806, the pre-processing module normalizes the input data. The pre-processing module whitens, at 808, the input data.

Figure 9:
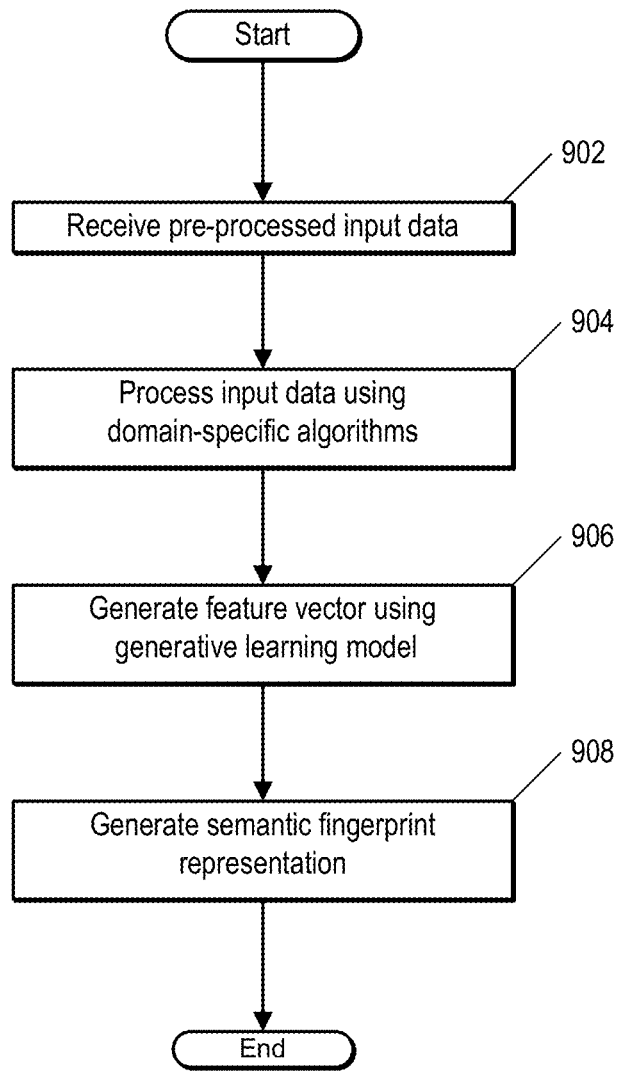

FIG. 9 is a flow chart showing a process for extracting feature vectors. In one embodiment, the method is performed by a crowd counting system, such system 100 of FIG. 1. Specifically, the process shown in FIG. 9 is performed by an extraction module, such as extraction module 174 of FIG. 1.

At 902, the extraction module receives pre-processed input data. The extraction module processes, at 904, the input data using domain-specific algorithms. For example, for a particular environment, a deep learning system having a particular topology can be selected. That is, the topology of the DL system can be selected in response to one or more variables associated with the environment. For example, the size of the environment, how crowded the environment is, and the like can form the basis for selecting the type of feature extraction process that will be performed and/or the configuration of the system that will do so.

At 906, the extraction module generates a feature vector using a generative learning model. The extraction module generates, at 908, a semantic fingerprint representation for the feature vector and transmits the semantic fingerprint to a classification module. Semantic fingerprints provide a measurement of whether a particular piece of input data is related to a person or object.

Figure 10:
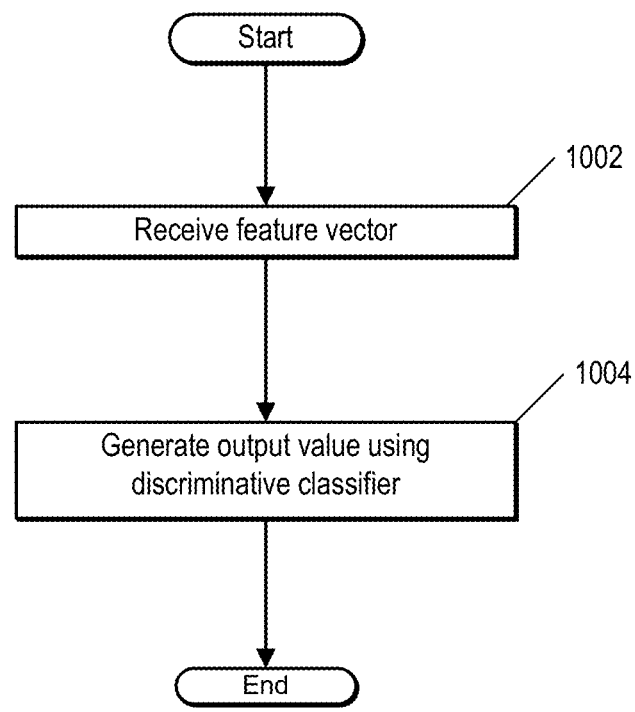

FIG. 10 is a flow chart showing a process for generating an output value. In one embodiment, the process is performed by a system, such as system 100 of FIG. 1. Specifically, the process shown in FIG. 10 is performed by a classification module, such as classification module 176 of FIG. 1.

At 1002, the classification module receives a feature vector from an extraction module. The classification module generates, at 1004, an output value using a discriminative classifier that predicts whether a particular piece of input data represents a person or object. In one embodiment, the output value includes a count value representing a number of people present in a representation of an environment, such as environment 300. The representation can include, for example, video data and/or other sensor data, such as Wi-Fi localization data.

Figure 11:
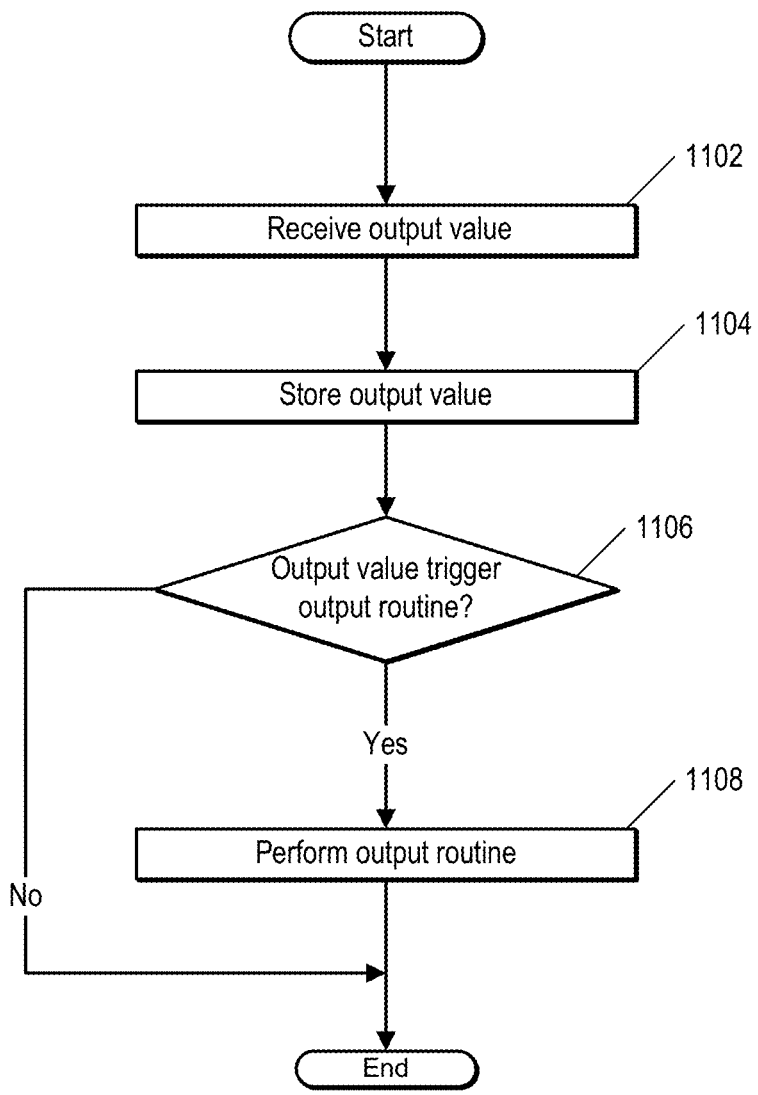

FIG. 11 is a flow chart showing a process for outputting data. In one embodiment, the process shown in FIG. 11 is performed by a system, such as system 100 of FIG. 1. Specifically, the process shown in FIG. 11 is performed by an output module, such as output module 178 of FIG. 1.

At 1102, the output module receives an output value. In one embodiment, the output module receives the output value from a classification module such as classification module 176 of FIG. 1. The output module stores, at 1104, the output value. In one embodiment, the output value is stored in a storage system, such as storage system 140 of FIG. 1.

At 1106, the output module determines whether the output value triggers an output routine. For example, if the output value is greater than a specified threshold or less than a specified threshold, the output module may be configured to perform various output routines.

In response to determining that the output value triggers an output routine, the output module performs, at 1108, the output routine. For example, if a count for a particular frame of video data was expected by the DL system to be one (e.g., the environment is a secure entryway and monitoring is triggered by badged access), but the count was two, such input could indicate a security breach (e.g., an example of so-called "tailgating") and a routine to alert security personal can be triggered. In another example, a person's movement is tracked, and based on deviation from expected patterns (e.g., linear traversal of a walkway in a building), an indication of a safety risk can be created and sent to building management personnel.

Figure 12:
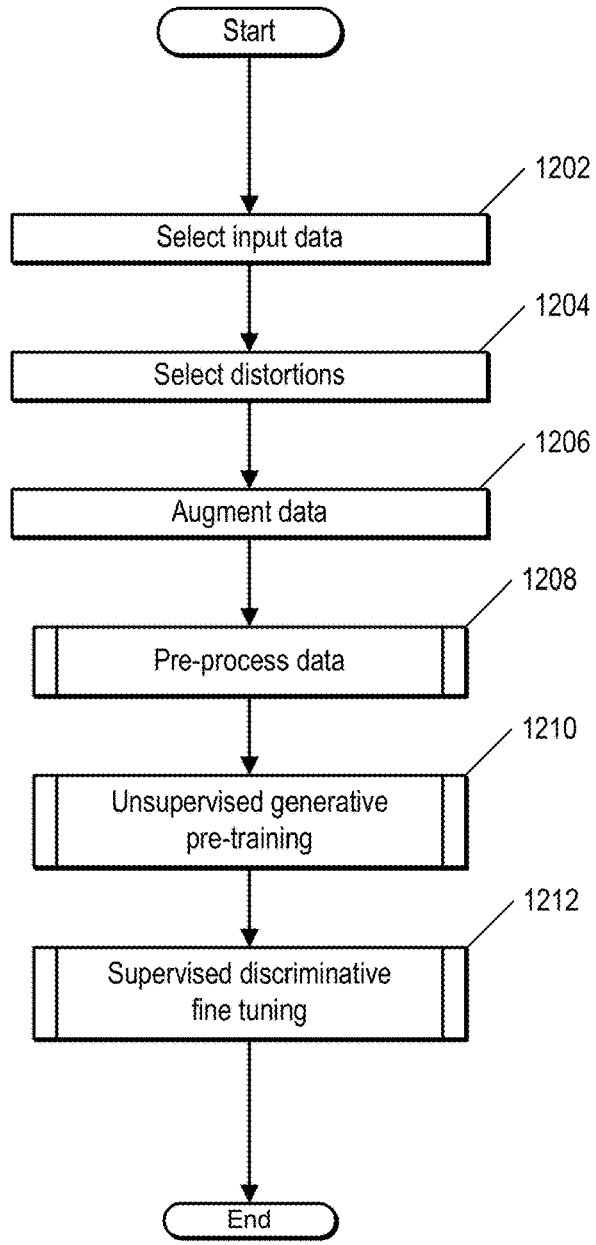

FIG. 12 shows a process of training a DL system, such as system 100 of FIG. 1. In one embodiment, the process shown in FIG. 12 is performed by a training module, such as training module 164 of FIG. 1. The training module can be configured by a user.

At 1202, the user selects input data. In one embodiment, the input data includes an annotated data set corresponding to a particular environment. The user selects, at 1204, one or more modifications to apply to the input data, such as distortions, or jitter. Selecting the jitter increases the amount of input data that can be supplied to the DL system. Modifications can include, for example, camera angle, resolution, perspective, zoom, scaling, luminosity, and other transformations.

At 1206, the user augments the data. In one embodiment, this is performed using an augmentation module, such as augmentation module 166. Augmenting the data involves, in one embodiment, applying the selected modifications to the input data. Injecting noise in the data augmentation phase improves the resiliency of the deep learning system against various types of artifacts. The DL system pre-processes, at 1208, the data. In one embodiment, pre-processing the data is performed using a process analogous to that described with respect to FIG. 8. That is, the data is quantized, normalized, and whitened.

At 1210, the training module directs an extraction module, such as extraction module 174 of FIG. 1, to perform unsupervised generative pre-training. Additional details of unsupervised generative pre-training are described with regard to FIG. 13. The training module directs, at 1212, a classification module, such as classification module 176 of FIG. 1, to perform supervised discriminative fine tuning Additional details of supervised discriminative fine tuning are described with regard to FIG. 14.

Figure 13:
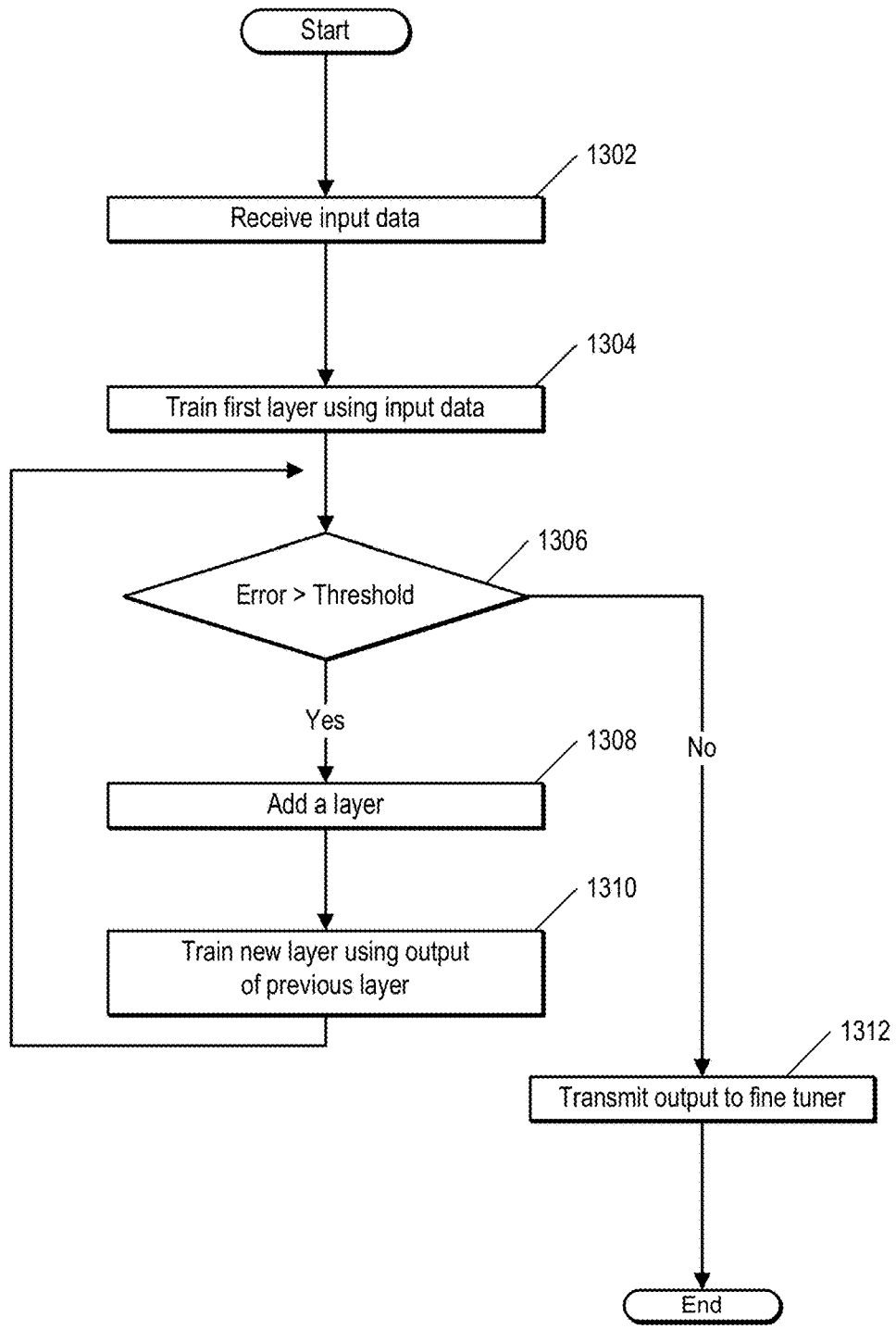

FIG. 13 is a flow chart illustrating a process of performing unsupervised generative pre-training. In one embodiment, an extraction module, such as extraction module 174 of FIG. 1 is pre-trained. At 1302, the extraction module receives input data. The extraction module trains, at 1304, a first layer of a DL system, such as system 100 of FIG. 1, using the input data.

At 1306, a training module, such as training module 164 of FIG. 1 determines whether the DL system is effectively trained. That is, the training module determines whether an error associated with the DL system is greater than the specified threshold. Various error metrics can be selected and evaluated by a user, such as mean absolute error (MAE) or mean squared error (MSE). If the error is higher than a pre-specified threshold, the training module determines that another layer should be added to the DL system. The training module adds the layer at 1308.

At 1310, the training module trains the new layer using output from a previous layer, and the process returns to 1306. As noted above, at 1306, the training module determines whether the error of the DL system is greater than a pre-specified threshold. If the DL system is accurate within the specified limit, the extraction module transmits an output to a classification module, such as classification module 176 of FIG. 1. In one embodiment, the output includes initial training weights for the classification module.

Figure 14:
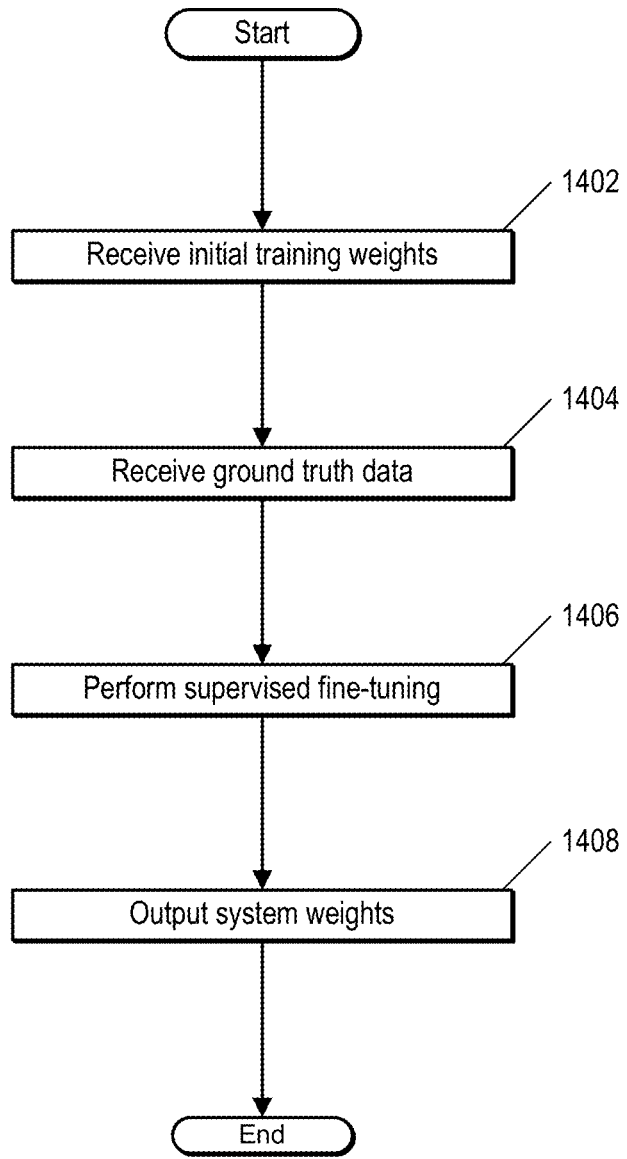

FIG. 14 is a flow chart showing a process of performing supervised discriminative fine tuning. In one embodiment, the process is performed by a classification module, such as classification module 176 of FIG. 1.

At 1402, the classification module receives initial training weights. The initial training weights can include, for example, training weights of a similar model. This is an example of implementing transfer learning. The classification module also receives, at 1404, ground truth data. In one embodiment, ground truth data includes annotated input data. At 1406, the classification module performs supervised fine tuning. The classification module outputs, at 1408, the learned system weights.

Figure 15:
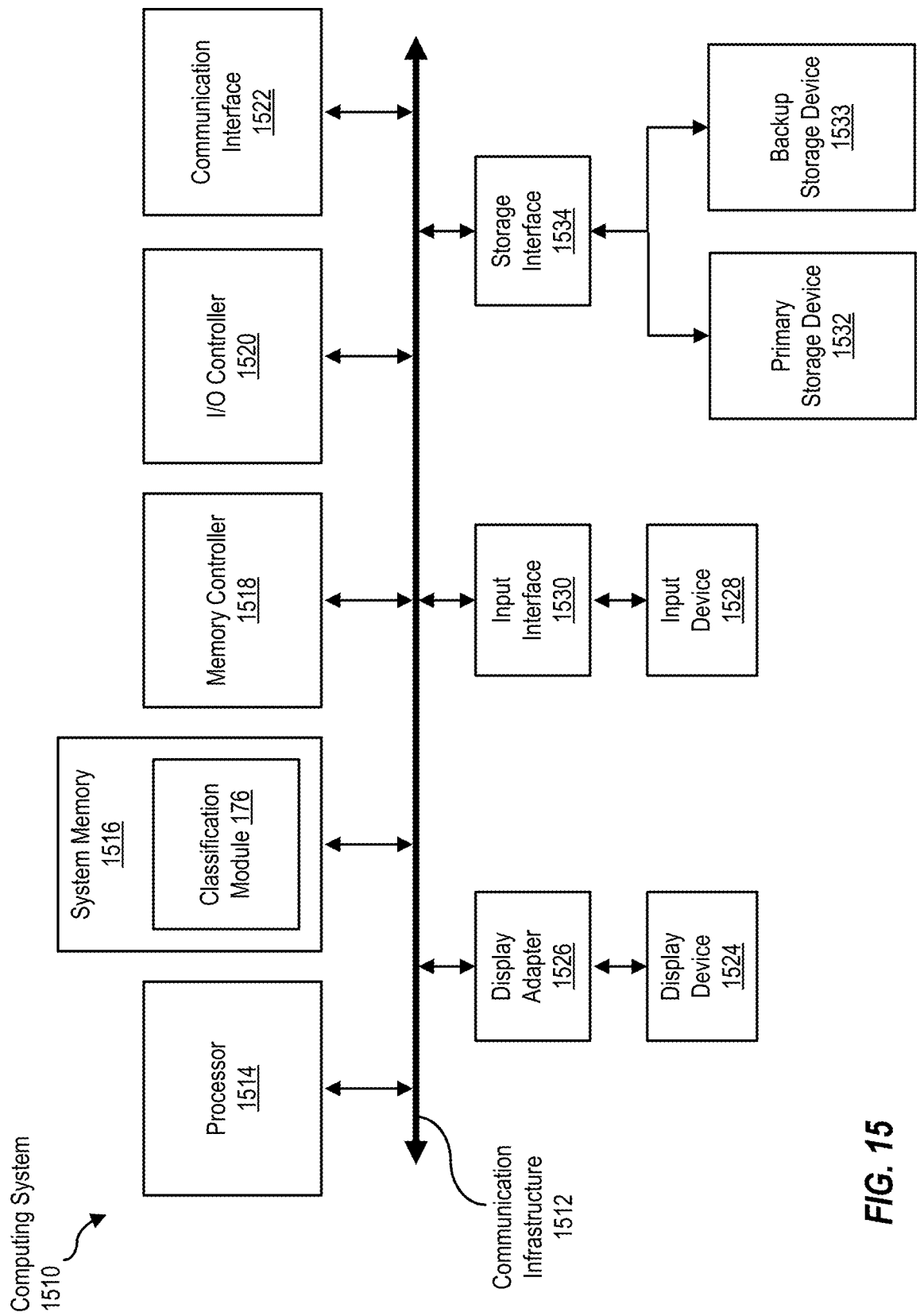
FIG. 15 is a block diagram depicting a network device suitable for implementing embodiments of the systems described herein.

FIG. 15 is a block diagram of a computing device, illustrating, for example, implementation of a classification module in software as described above. Computing system 1510 broadly represents any single or multi-processor computing device or system capable of executing computer-readable instructions. Examples of computing system 1510 include, without limitation, any one or more of a variety of devices including workstations, personal computers, laptops, client-side terminals, servers, distributed computing systems, handheld devices (e.g., personal digital assistants and mobile phones), network appliances, switches, routers, storage controllers (e.g., array controllers, tape drive controller, or hard drive controller), and the like. In its most basic configuration, computing system 1510 may include at least one processor 1514 and a system memory 1516. By executing the software that implements classification module 176, computing system 1510 becomes a special purpose computing device that is configured to perform people counting, in the manner described above.

Processor 1514 generally represents any type or form of processing unit capable of processing data or interpreting and executing instructions. In certain embodiments, processor 1514 may receive instructions from a software application or module. These instructions may cause processor 1514 to perform the functions of one or more of the embodiments described and/or illustrated herein. For example, processor 1514 may perform and/or be a means for performing the operations described herein. Processor 1514 may also perform and/or be a means for performing any other operations, methods, or processes described and/or illustrated herein.

System memory 1516 generally represents any type or form of volatile or non-volatile storage device or medium capable of storing data and/or other computer-readable instructions. Examples of system memory 1516 include, without limitation, random access memory (RAM), read only memory (ROM), flash memory, or any other suitable memory device. Although not required, in certain embodiments computing system 1510 may include both a volatile memory unit (such as, for example, system memory 1516) and a non-volatile storage device (such as, for example, primary storage device 1532, as described in detail below). In one example, program instructions executable to implement a forwarding module configured to forward multicast data packets may be loaded into system memory 1516.

In certain embodiments, computing system 1510 may also include one or more components or elements in addition to processor 1514 and system memory 1516. For example, as illustrated in FIG. 15, computing system 1510 may include a memory controller 1518, an Input/Output (I/O) controller 1520, and a communication interface 1522, each of which may be interconnected via a communication infrastructure 1512. Communication infrastructure 1512 generally represents any type or form of infrastructure capable of facilitating communication between one or more components of a computing device. Examples of communication infrastructure 1512 include, without limitation, a communication bus (such as an Industry Standard Architecture (ISA), Peripheral Component Interconnect (PCI), PCI express (PCIe), or similar bus) and a network.

Memory controller 1518 generally represents any type or form of device capable of handling memory or data or controlling communication between one or more components of computing system 1510. For example, in certain embodiments memory controller 1518 may control communication between processor 1514, system memory 1516, and I/O controller 1520 via communication infrastructure 1512. In certain embodiments, memory controller 1518 may perform and/or be a means for performing, either alone or in combination with other elements, one or more of the operations or features described and/or illustrated herein.

I/O controller 1520 generally represents any type or form of module capable of coordinating and/or controlling the input and output functions of a computing device. For example, in certain embodiments I/O controller 1520 may control or facilitate transfer of data between one or more elements of computing system 1510, such as processor 1514, system memory 1516, communication interface 1522, display adapter 1526, input interface 1530, and storage interface 1534.

Communication interface 1522 broadly represents any type or form of communication device or adapter capable of facilitating communication between computing system 1510 and one or more additional devices. For example, in certain embodiments communication interface 1522 may facilitate communication between computing system 1510 and a private or public network including additional computing systems. Examples of communication interface 1522 include, without limitation, a wired network interface (such as a network interface card), a wireless network interface (such as a wireless network interface card), a modem, and any other suitable interface. In at least one embodiment, communication interface 1522 may provide a direct connection to a remote server via a direct link to a network, such as the Internet. Communication interface 1522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1522 may also represent a host adapter configured to facilitate communication between computing system 1510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 15054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 1522 may also allow computing system 1510 to engage in distributed or remote computing. For example, communication interface 1522 may receive instructions from a remote device or send instructions to a remote device for execution.

As illustrated in FIG. 15, computing system 1510 may also include at least one display device 1524 coupled to communication infrastructure 1512 via a display adapter 1526. Display device 1524 generally represents any type or form of device capable of visually displaying information forwarded by display adapter 1526. Similarly, display adapter 1526 generally represents any type or form of device configured to forward graphics, text, and other data from communication infrastructure 1512 (or from a frame buffer) for display on display device 1524.

As illustrated in FIG. 15, computing system 1510 may also include at least one input device 1528 coupled to communication infrastructure 1512 via an input interface 1530. Input device 1528 generally represents any type or form of input device capable of providing input, either computer or human generated, to computing system 1510. Examples of input device 1528 include, without limitation, a keyboard, a pointing device, a speech recognition device, or any other input device.

As illustrated in FIG. 15, computing system 1510 may also include a primary storage device 1532 and a backup storage device 1533 coupled to communication infrastructure 1512 via a storage interface 1534. Storage devices 1532 and 1533 generally represent any type or form of storage device or medium capable of storing data and/or other computer-readable instructions. For example, storage devices 1532 and 1533 may be a magnetic disk drive (e.g., a so-called hard drive), a floppy disk drive, a magnetic tape drive, an optical disk drive, a flash drive, or the like. Storage interface 1534 generally represents any type or form of interface or device for transferring data between storage devices 1532 and 1533 and other components of computing system 1510. A storage device like primary storage device 1532 can store information such as routing tables and forwarding tables.

In certain embodiments, storage devices 1532 and 1533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1532 and 1533 may also include other similar structures or devices for allowing computer software, data, or other computer-readable instructions to be loaded into computing system 1510. For example, storage devices 1532 and 1533 may be configured to read and write software, data, or other computer-readable information. Storage devices 1532 and 1533 may also be a part of computing system 1510 or may be a separate device accessed through other interface systems.

Many other devices or subsystems may be connected to computing system 1510. Conversely, all of the components and devices illustrated in FIG. 15 need not be present to practice the embodiments described and/or illustrated herein. The devices and subsystems referenced above may also be interconnected in different ways from that shown in FIG. 15.

Computing system 1510 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1510 for storage in memory via a network such as the Internet or upon a carrier medium.

The computer-readable medium containing the computer program may be loaded into computing system 1510. All or a portion of the computer program stored on the computer-readable medium may then be stored in system memory 1516 and/or various portions of storage devices 1532 and 1533. When executed by processor 1514, a computer program loaded into computing system 1510 may cause processor 1514 to perform and/or be a means for performing the functions of one or more of the embodiments described and/or illustrated herein. Additionally or alternatively, one or more of the embodiments described and/or illustrated herein may be implemented in firmware and/or hardware. For example, computing system 1510 may be configured as an application specific integrated circuit (ASIC) adapted to implement one or more of the embodiments disclosed herein.

Although the present disclosure describes several embodiments, the disclosure is not intended to be limited to the specific forms set forth herein. On the contrary, it is intended to cover such alternatives, modifications, and equivalents as can be reasonably included within the scope of the invention as defined by any associated claims.

What is claimed is:

1. A method comprising:
   pre-training an analytics system, wherein
      the pre-training comprises
         generating an augmented data set, wherein
            the generating the augmented data set comprises injecting one or more modifications into a ground truth data set, and
               the one or more modifications are selected by a domain expert,
         generating a semantic fingerprint that comprises a probability distribution, and
         utilizing the augmented data set and the semantic fingerprint to perform an unsupervised generative pre-training process and a supervised discriminative fine-tuning process;
   receiving input data at a processor of the analytics system, wherein
      the input data comprises a representation of an environment at a first point in time,
      the representation of the environment is based, at least in part, on data captured by one or more sensors configured to capture visual data,
      the representation of the environment comprises a plurality of representations of persons, and
      the analytics system comprises an artificial neural network; and
   subsequent to the pre-training, using the analytics system to perform operations comprising:
      pre-processing the input data, wherein
         the pre-processing comprises whitening the input data, wherein
            whitening the input data comprises transforming the input data to uncorrelated values,
      identifying, using the processor, a representation of a person of the plurality of representations of persons, wherein
         the identifying comprises
            generating a feature vector using a generative process, wherein
               the feature vector comprises a sparse distributed representation of the input data, and
            applying a discriminative process to the feature vector to identify the representation of the person,
      generating a count of a number of persons identified as being present within the input data, wherein
         the count is generated, at least in part, by using the representation of the person, and
      updating a value, based, at least in part, on the count, wherein
         the value indicates the number of persons identified as being present within the input data.

2. The method of claim 1, further comprising:
   selecting an output routine based on the value; and
   performing the output routine.

3. The method of claim 1, further comprising:
   automatically compensating for a plurality of occlusions, wherein
      the input data comprises a visual representation of the environment, and
      the visual representation comprises the plurality of occlusions.

4. The method of claim 1, further comprising:
   converging sensor information from a plurality of input sources to form the input data, wherein
      the sensor information comprises image data and location information received from one or more wireless devices.

5. The method of claim 1, wherein
   pre-training the analytics system further comprises performing one or more pre-training operations of the analytics system, wherein
      the pre-training operations utilize the augmented data set and the semantic fingerprint.

6. The method of claim 1, further comprising:
determining whether an error associated with the analytics system is greater than a specified threshold;
in response to determining that the error is greater than the specified threshold, adding a layer; and
subsequent to adding the layer, pre-training the layer.

7. The method of claim 1, further comprising:
mapping a first number of input values to a second number of discrete values in order to reduce an amount of data to be processed, wherein
   the first number is greater than the second number,
   the input values comprise at least one of color data and position data, and
   the mapping further comprises associating a time with each of the input values.

8. The method of claim 1, further comprising:
training a deep multimodal autoencoder in an unsupervised mode until an acceptable level of reconstruction error is reached, wherein
the deep multimodal autoencoder comprises an artificial neural network.

9. A system comprising:
a memory; and
a processor coupled to the memory and configured to perform a method comprising:
   pre-training an analytics system, wherein
      the pre-training comprises
         generating an augmented data set, wherein
            the generating the augmented data set comprises injecting one or more modifications into a ground truth data set, and
            the one or more modifications are selected by a domain expert,
         generating a semantic fingerprint that comprises a probability distribution, and
         utilizing the augmented data set and the semantic fingerprint to perform an unsupervised generative pre-training process and a supervised discriminative training fine-tuning process;
   receiving input data at the processor, wherein
      the input data comprises a representation of an environment at a first point in time,
      the representation of the environment is based, at least in part, on data captured by one or more sensors configured to capture visual data,
      the representation of the environment comprises a plurality of representations of persons, and
      the system comprises an artificial neural network; and
   subsequent to the pre-training, using the analytics system to perform operations comprising:
      pre-processing the input data, wherein
         the pre-processing comprises whitening the input data, wherein
            whitening the input data comprises transforming the input data to uncorrelated values,
         identifying, using the processor, a representation of a person of the plurality of representations of persons, wherein
            identifying the representation of the person comprises
               generating a feature vector using a generative process, wherein
                  the feature vector comprises a sparse distributed representation of the input data, and
               applying a discriminative process to the feature vector to identify the representation of the person,
            generating a count of a number of persons identified as being present within the input data, wherein
               the count is generated, at least in part, by using the representation of the person, and
            updating a value, based, at least in part, on the count, wherein
               the value indicates the number of persons identified as being present within the input data.

10. The system of claim 9, wherein the method comprises:
selecting an output routine based on the value; and
performing the output routine.

11. The system of claim 9, wherein the method further comprises:
automatically compensating for a plurality of occlusions, wherein
   the input data comprises a visual representation of the environment, and
   the visual representation comprises the plurality of occlusions.

12. The system of claim 9, wherein the method further comprises:
converging sensor information from a plurality of input sources to form the input data, wherein
   the sensor information comprises image data and location information received from one or more wireless devices.

13. The system of claim 9, wherein
pre-training the analytics system further comprises performing one or more pre-training operations of the analytics system, wherein
   the pre-training operations utilize the augmented data set and the semantic fingerprint.

14. The system of claim 9, wherein the method comprises:
mapping a first number of input values to a second number of discrete values in order to reduce an amount of data to be processed, wherein
   the first number is greater than the second number,
   the input values comprise at least one of color data and position data, and
   the mapping further comprises associating a time with each of the input values; and
training a deep multimodal autoencoder in an unsupervised mode until an acceptable level of reconstruction error is reached, wherein
   the deep multimodal autoencoder comprises an artificial neural network.

15. A non-transitory computer readable storage medium comprising program instructions executable to perform a method comprising:
pre-training an analytics system, wherein
   the pre-training comprises
      generating an augmented data set, wherein
         the generating the augmented data set comprises injecting one or more modifications into a ground truth data set, and
         the one or more modifications are selected by a domain expert,
      generating a semantic fingerprint that comprises a probability distribution, and
      utilizing the augmented data set and the semantic fingerprint to perform an unsupervised generative pre-training process and a supervised discriminative fine-tuning process;

receiving input data at a processor of the analytics system, wherein
  the input data comprises a representation of an environment at a first point in time,
  the representation of the environment is based, at least in part, on data captured by one or more sensors configured to capture visual data,
  the representation of the environment comprises a plurality of representations of persons, and
  the analytics system comprises an artificial neural network; and
subsequent to the pre-training, using the analytics system to perform operations comprising:
  pre-processing the input data, wherein
    the pre-processing comprises whitening the input data, wherein
      whitening the input data comprises transforming the input data to uncorrelated values,
  identifying, using the processor, a representation of a person of the plurality of representations of persons, wherein
    identifying the representation of the person comprises
      generating a feature vector using a generative process, wherein
        the feature vector comprises a sparse distributed representation of the input data, and
      applying a discriminative process to the feature vector to identify the representation of the person,
  generating a count of a number of persons identified as being present within the input data, wherein
    the count is generated, at least in part, by using the representation of the person, and
  updating a value, based, at least in part, on the count, wherein
    the value indicates the number of persons identified as being present within the input data.

16. The non-transitory computer readable storage medium of claim 15, wherein the method further comprises:
selecting an output routine based on the value; and
performing the output routine.

\* \* \* \* \*